US011963092B2

(12) United States Patent
Wu et al.

(10) Patent No.: US 11,963,092 B2
(45) Date of Patent: Apr. 16, 2024

(54) METHOD FOR CONNECTING TO A NETWORK ACCESS DEVICE, TERMINAL AND COMPUTER-READABLE STORAGE MEDIUM

(71) Applicant: CHENGDU XGIMI TECHNOLOGY CO., LTD., Sichuan (CN)

(72) Inventors: Hao Wu, Sichuan (CN); Fang Xie, Sichuan (CN); Yang Liao, Sichuan (CN)

(73) Assignee: CHENGDU XGIMI TECHNOLOGY CO., LTD., Chengdu (CN)

( * ) Notice: Subject to any disclaimer, the term of this patent is extended or adjusted under 35 U.S.C. 154(b) by 380 days.

(21) Appl. No.: 17/600,148

(22) PCT Filed: Jul. 17, 2020

(86) PCT No.: PCT/CN2020/102638
§ 371 (c)(1),
(2) Date: Sep. 30, 2021

(87) PCT Pub. No.: WO2021/248629
PCT Pub. Date: Dec. 16, 2021

(65) Prior Publication Data
US 2022/0322213 A1     Oct. 6, 2022

(30) Foreign Application Priority Data
Jun. 8, 2020  (CN) .......................... 202010509506.0

(51) Int. Cl.
*H04W 48/16* (2009.01)
*H04W 60/00* (2009.01)
*H04W 76/15* (2018.01)

(52) U.S. Cl.
CPC ........... *H04W 48/16* (2013.01); *H04W 60/00* (2013.01); *H04W 76/15* (2018.02)

(58) Field of Classification Search
CPC ..... H04W 48/16; H04W 60/00; H04W 76/15; H04W 76/19; H04W 76/10
See application file for complete search history.

(56) References Cited

U.S. PATENT DOCUMENTS

| 2019/0053311 | A1 | 2/2019 | Cariou et al. |
| 2019/0116545 | A1 | 4/2019 | Verma et al. |
| 2019/0215884 | A1 | 7/2019 | Patil et al. |
| 2019/0335454 | A1 | 10/2019 | Huang et al. |
| 2019/0364555 | A1 | 11/2019 | Huang et al. |
| 2020/0015219 | A1 | 1/2020 | Asterjadhi et al. |
| 2020/0077350 | A1 | 3/2020 | Gidvani et al. |
| 2020/0137690 | A1 | 4/2020 | Min et al. |
| 2020/0344677 | A1* | 10/2020 | Cherian ............... H04W 40/244 |
| 2021/0014911 | A1* | 1/2021 | Patil .................. H04W 72/0446 |
| 2022/0132611 | A1* | 4/2022 | Fang .................... H04W 28/06 |
| 2022/0183062 | A1* | 6/2022 | Seok ................. H04W 28/0278 |

FOREIGN PATENT DOCUMENTS

| CN | 110831107 A | 2/2020 |
| CN | 111405684 A | 7/2020 |
| EP | 3627742 A2 | 3/2020 |

OTHER PUBLICATIONS

The First Office Action forChinese Application No. 202010509506. 0, dated Jul. 16, 2020, 12 pages.
The Grant Notification for Chinese Application No. 202010509506. 0, dated Jul. 30, 2020, 6 pages.
The First Office Action for Japan Application No. 2021-554656, dated Oct. 18, 2022, 11 pages.
The International search report for PCT Application No. PCT/CN2020/102638, dated Mar. 10, 2021, 7 pages.
Chu, Liwen et al., Beacon, Capability, operating parameters, IEEE 802.11-190395r2, Mar. 1, 2020, 10 pages.
Jang, Insun et al., Discussion on Multi-link Setup, IEEE 802.11-191509r5, Sep. 16, 2019, 13 pages.
Jang, Insun et al., Indication of Multi-link Information, IEEE 802.11-20/0028r6, Jan. 13, 2020, 14 pages.
Jeongki Kim et al., EHT Power saving considering multi-link, IEEE 802.11-19/1510r6, Sep. 15, 2019,16 pages.
Ming Gan et al., Power Save for Multi-link, IEEE 802.11-19/1988-03-00be, Nov. 11, 2019, 16 pages.
Zhou, Lan et al., IEEE P802. 11 Wireless LANs, IEEE 802.11-20/39r6, Jan. 20, 2020, 9 pages.
Wisnu Murti et al., Performance and Fairness of Multi-link Operation, IEEE 802.11-19/1633r1, Nov. 9, 2019, 19 pages.

\* cited by examiner

*Primary Examiner* — Chae S Lee
(74) *Attorney, Agent, or Firm* — East IP P.C.

(57) ABSTRACT

The application discloses a method for connecting to a network access device, a terminal and a computer-readable storage medium. The method includes: transmitting an association request message or a reassociation request message to the network access device; receiving an association response message or a reassociation response message sent by the network access device, wherein the association response message or the reassociation response message includes parameters of AP-EHT Capabilities, EHT Operation, TWT Responder Support and TWT Required, and wherein the AP-EHT Capabilities includes a field of AP-ML Support and the EHT Operation includes a field of AP-Primary Link; reading contents of the association response message or the reassociation response message, and performing a multi-link operation on the basis of the contents.

16 Claims, No Drawings

METHOD FOR CONNECTING TO A NETWORK ACCESS DEVICE, TERMINAL AND COMPUTER-READABLE STORAGE MEDIUM

The application is a national stage of an international application No. PCT/CN2020/102638 filed on Jul. 17, 2020, which claims a priority of the Chinese patent application No. 202010509506.0, filed on Jun. 8, 2020 and entitled by "METHOD FOR CONNECTING TO A NETWORK ACCESS DEVICE, TERMINAL AND COMPUTER-READABLE STORAGE MEDIUM", both of which are incorporated herein by reference in their entireties.

TECHNICAL FIELD

The application relates to the field of wireless communication, and in particular to a method for connecting to a network access device, a terminal, and a computer-readable storage medium.

BACKGROUND

An 802.11be network, also known as Extremely High Throughput (EHT) network, achieves extremely high throughput through a range of system features and various mechanism enhancements. As continuous growth in use of a wireless local area network (WLAN), it is becoming increasingly important to provide wireless data services for various environments, such as at home, in an office, or at a hotspot. In particular, video traffics will continue to be the main traffic type in many WLAN deployments. Due to emergence of 4 k and 8 k videos (with a rate of 20 Gbps in an uncompressed state), throughput requirements of these applications are continually increasing. New types of high-throughput and low-latency applications such as a virtual reality application, an augmented reality application, a gaming application, a remote office application, and a cloud computing application are also greatly increasing (for example, a real-time game requires a latency of less than 5 milliseconds).

In view of requirements of high throughput and strict latency of these applications, a user expects a higher throughput, a higher reliability, a small latency and jitter, and a higher power efficiency when using a WLAN to support such an application. A user also expects an improved integration with a Time Sensitive Network (TSN) to support the applications in a heterogeneous Ethernet or the WLAN. The 802.11be network aims to ensure competitiveness of the WLAN by further improving total throughput and reducing latency, while ensuring backward compatibility and coexistence with older technical standards. An 802.11 compatible device is operable at frequencies of 2.4 GHz, 5 GHz and 6 GHz.

Regarding the 802.11be network, it is proposed to establish multiple data transmission links between a terminal and an access point for simultaneous transmission to improve a transmission efficiency, so as to achieve the above discussed purposes.

SUMMARY

For a connection of a terminal that supports multiple links to a network, the terminal needs to exchange capability information with a network access device and the network access device should allocate corresponding parameters to the terminal according to capabilities of the terminal.

In a first aspect of the present application, there is provided a method for connecting to a network access device, including: transmitting an association request message or a reassociation request message to the network access device; receiving an association response message or a reassociation response message sent by the network access device, wherein the association response message or the reassociation response message comprises a parameter of AP-EHT Capabilities, a parameter of EHT Operation, a parameter of TWT Responder Support for indicating whether the network access device supports a TWT response function, and a parameter of TWT Required for indicating whether the network access device expects a terminal to perform a TWT operation, and wherein the parameter of AP-EHT Capabilities comprises a field of AP-ML Support for indicating whether the network access device supports data transceiving via multiple links, and the parameter of EHT Operation comprises a field of AP-Primary Link for indicating a primary link for a multi-link operation; and reading contents of the association response message or the reassociation response message, and performing a multi-link operation on the basis of the contents.

In an embodiment, the performing the multi-link operation on the basis of the contents may include: transmitting a TWT request message to the network access device on the primary link according to primary link information indicated in the AP-Primary Link when the TWT Required indicates that the network access device expects the terminal to perform the TWT operation, the TWT Responder Support indicates that the network access device supports the TWT response function and the AP-ML Support indicates that the network access device supports the data transceiving via multiple links; and receiving, on the primary link, a TWT response message sent by the network access device, and applying parameters in the TWT response message to respective links used by the terminal.

In an embodiment, the parameter of EHT Operation may further include a field of AP-STR Support for indicating a condition under which the network access device instructs the terminal that a STR operation is operable, wherein the field comprises one or more of the following parameters: AP-Diff_TxRx for indicating a threshold value of a difference between a transmitting power and a receiving power; and AP-Min_F for indicating a threshold value of a difference between a transmitting frequency and a receiving frequency.

In an embodiment, the performing the multi-link operation on the basis of the contents may further include: performing the STR operation when an absolute value of the difference between the transmitting power and the receiving power of the terminal is less than or equal to the AP-Diff_TxRx, or/and an absolute value of the difference between the transmitting frequency and the receiving frequency of the terminal is greater than or equal to the AP-Min_F.

In an embodiment, the parameters of AP-EHT Capabilities, EHT Operation and TWT Responder Support in the association response message or the reassociation response message are set according to a parameter table locally at the network access device, which includes: including the parameters of AP-EHT Capabilities and EHT Operation in the association response message or the reassociation response message when a parameter of AP-dot11 EHTOptionImplemented in the parameter table indicates that the network access device supports an EHT feature; setting the TWT Responder Support to indicate that the network access device supports the TWT response function when a parameter of AP-dot11TWTOptionActivated in the parameter table indicates that the network access device expects utilization of the TWT operation and the network access device supports the TWT response function; and setting the AP-Primary Link when a parameter of AP-dot11 MultiLinkImplemented in the parameter table indicates that the network access device supports the multi-link operation.

In an embodiment, the parameter of EHT Operation in the association response message or the reassociation response message is set according to the parameter table locally at the network access device, which includes: setting the parameters included in the AP-STR Support when a parameter of AP-dot11SimultaneoursTxRxPreferred in the parameter table indicates that the network access device expects preferential utilization of the STR operation.

In an embodiment, the association request message or the reassociation request message may include a parameter of STA-EHT Capabilities and a parameter of TWT Requester Support for indicating whether the terminal supports a TWT request function, wherein the parameter of STA-EHT Capabilities comprises a field of STA-ML Support for indicating whether the terminal supports data transceiving via multiple links.

In an embodiment, the parameter of STA-EHT Capabilities further includes a field of STA-STR Support for indicating a condition under which the terminal can perform a STR operation, and the field of STA-STR Support comprises one or more of the following parameters: STA-Diff_TxRx for indicating a threshold value of a difference between a transmitting power and a receiving power; and STA-Min_F for indicating a threshold value of a difference between a transmitting frequency and a receiving frequency.

In an embodiment, the performing the multi-link operation on the basis of the contents may further include: performing the STR operation when an absolute value of the difference between the transmitting power and the receiving power of the terminal is less than or equal to the STA-Diff_TxRx, or/and an absolute value of the difference between the transmitting frequency and the receiving frequency of the terminal is greater than or equal to the STA-Min_F.

In an embodiment, the association request message or the reassociation request message may further include a parameter of STA-Primary Link for indicating a primary link that the terminal expects to operate.

In an embodiment, the parameters of STA-EHT Capabilities and TWT Requester Support in the association request message or the reassociation request message are set according to a parameter table locally at the terminal, which includes: including the parameter of STA-EHT Capabilities in the association request message or the reassociation request message when a parameter STA-dot11EHT OptionImplemented in the parameter table indicates that the terminal supports an EHT feature; setting the TWT Requester Support to indicate that the terminal supports a TWT request function when a parameter STA-dot11TWTOptionActivated in the parameter table indicates that the terminal expects to perform a TWT operation and the terminal supports the TWT request function; and setting the STA-ML Support to indicate that the terminal supports the data transceiving via multiple links when a parameter of STA-dot11 MultiLinkImplemented in the parameter table indicates that the terminal supports a multi-link operation and the terminal expects to operate multiple links for data transceiving, or setting the STA-ML Support to indicate that the terminal supports the data transceiving via multiple links when the parameter of STA-dot11MultiLinkImplemented in the parameter table indicates that the terminal supports the multi-link operation.

In an embodiment, the parameter of STA-EHT Capabilities in the association request message or the reassociation request message is set according to the parameter table locally at the terminal, which includes: setting the parameters included in STA-STR Support when a parameter of STA-dot11SimultaneoursTxRxPreferred in the parameter table indicates that the terminal expects to preferentially perform the STR operation.

In an embodiment, the parameter of STA-Primary Link in the association request message or the reassociation request message is set according to the parameter table locally at the terminal, which includes: including the parameter of STA-Primary Link in the association request message or the reassociation request message when a parameter of STA-dot11MultiLinkImplemented in the parameter table indicates that the terminal supports a multi-link operation.

In a second aspect of the present application, there is provided a terminal to be connected to a network access device, including: a memory for storing programs; and a processor coupled to the memory, and configured to execute the programs to cause the terminal to perform the method for connecting to the network access device according to any one of the first aspect and possible implementations for the first aspect.

In a third aspect of the present application, there is provided a terminal to be connected to a network access device, including: an association request message transmission device configured to transmit an association request message or a reassociation request message to the network access device; an association response message reception device configured to receive an association response message or a reassociation response message sent by the network access device, wherein the association response message or the reassociation response message comprises a parameter of AP-EHT Capabilities, a parameter of EHT Operation, a parameter of TWT Responder Support for indicating whether the network access device supports a TWT response function, and a parameter of TWT Required for indicating whether the network access device expects a terminal to perform a TWT operation, and wherein the parameter of AP-EHT Capabilities comprises a field of AP-ML Support for indicating whether the network access device supports data transceiving via multiple links, and the parameter of EHT Operation comprises a field of AP-Primary Link for indicating a primary link for a multi-link operation; and a multi-link operation device configured to read contents of the association response message or the reassociation response message, and perform a multi-link operation on the basis of the contents.

In an embodiment, the performing the multi-link operation by the multi-link operation device based on the contents may include: transmitting a TWT request message to the network access device on the primary link according to primary link information indicated in the AP-Primary Link, when the TWT Required indicates that the network access device expects the terminal to perform the TWT operation, the TWT Responder Support indicates that the network access device supports the TWT response function and the AP-ML Support indicates that the network access device supports the data transceiving via multiple links; and receiving, on the primary link, a TWT response message sent by the network access device, and applying parameters in the TWT response message to respective links used by the terminal.

In a fourth aspect of the present application, there is provided a computer-readable storage medium comprising computer instructions, which when executed on a terminal, cause the terminal to perform the method for connecting to the network access device according to any one of the first aspect and possible implementations for the first aspect.

The application allows a terminal to perform a multi-link operation under management and control of a network access device by setting parameters in messages exchanged between the terminal and the network access device, in which a TWT request message and a TWT response messages are delivered on a same link, and then the parameters in the TWT response message received on the link are applied to respective links used by the terminal, and a STR operation is performed when a preset condition is met, and thereby an overall network throughput and wireless resource utilization efficiency can be improved.

DETAILED DESCRIPTION

The technical solutions of the application will be described below.

In the embodiments of the application, terms such as "exemplary" and "for example" are used for providing examples, explanations, or illustrations. Any embodiment or design solution described as an "example" in the application should not be construed as being more preferable or having more advantageous than other embodiments or design solutions. Rather, the term "example" is used to present a concept in a concrete way.

In order to make objectives, technical solutions and advantages of the application clearer, the application will be further described in detail with reference to specific embodiments. It should be understood that the specific embodiments described here are only used to explain the application, and are not used to limit the application.

A method for connecting to a network access device in the application includes: transmitting an association request message or a reassociation request message to the network access device; receiving an association response message or a reassociation response message sent by the network access device, wherein the association response message or the reassociation response message includes a parameter of AP-EHT Capabilities, a parameter of EHT Operation, a parameter of TWT Responder Support for indicating whether the network access device supports a TWT response function, and a parameter of TWT Required for indicating whether the network access device expects a terminal to perform a TWT operation, and wherein the parameter of AP-EHT Capabilities includes a field of AP-ML Support for indicating whether the network access device supports data transceiving via multiple links, and the parameter of EHT Operation includes a field of AP-Primary Link for indicating a primary link for a multi-link operation, and in some embodiments, the parameter of EHT Operation further includes a field of AP-STR Support for indicating a condition under which the network access device instructs the terminal that a STR operation is operable; and reading contents of the association response message or the reassociation response message, and performing a multi-link operation on the basis of the contents.

In some embodiments, the performing the multi-link operation on the basis of the contents may include: transmitting a TWT request message to the network access device on the primary link according to primary link information indicated in the AP-Primary Link when the TWT Required indicates that the network access device expects the terminal to perform the TWT operation, the TWT Responder Support indicates that the network access device supports the TWT response function and the AP-ML Support indicates that the network access device supports the data transceiving via multiple links; and receiving, on the primary link, a TWT response message sent by the network access device, and applying parameters in the TWT response message to respective links used by the terminal.

In some embodiments, the association request message or the reassociation request message may include a parameter of STA-EHT Capabilities and a parameter of TWT Requester Support for indicating whether the terminal supports a TWT request function, wherein the parameter of STA-EHT Capabilities comprises a field of STA-ML Support for indicating whether the terminal supports data transceiving via multiple links. Optionally, the parameter of STA-EHT Capabilities may further include a field of STA-STR Support for indicating a condition under which the terminal can perform a STR operation. The association request message or the reassociation request message may also include a parameter of STA-Primary Link for indicating a primary link that the terminal expects to operate.

Exemplarily, each of the terminal and the network access device may maintain locally a parameter table, and the parameter table may include at least one or more of the following parameters:

dot11EHTOptionImplemented: indicating that the current device supports an EHT feature if it is "true";

dot11TWTOptionActivated: indicating that the current device expects to perform a TWT operation if it is "true";

dot11SimultaneoursTxRxPreferred: indicating that the current device prefers to operate a STR operation if it is "true"; and dot11MultiLinkImplemented: indicating that the current device supports a multi-link operation if it is "true".

The terminal or the network access device can decide which parameter or information element will be included in the interactive information according to values of the parameters in the parameter table.

The description will be given below in conjunction with a specific embodiment.

In the following specific embodiment, a STA represents a terminal device in a network, and an AP represents an access point in the network, which is one type of a network access device. In other embodiments, the network access device may be any other device such as a router, etc. The embodiment will be described by taking the AP as an example.

In the specific embodiment, each of the STA and the AP maintains locally a parameter table, which includes at least one or more of the following parameters:

dot11EHTOptionImplemented: indicating that the current device supports an EHT feature if it is "true";

dot11TWTOptionActivated: indicating that the current device expects to perform a TWT operation if it is "true";

dot11SimultaneoursTxRxPreferred: indicating that the current device prefers to operate a STR operation if it is "true"; and dot11MultiLinkImplemented: indicating that the current device supports a multi-link operation if it is "true".

The method for connecting to a network access device includes the following steps:

1. The STA sends an association request (Association Request) message to the AP. For example, the message includes parameters of Capability Information (for informing the AP of what kind of performance the STA has), EHT Capabilities (for informing the AP of ultra-high throughput implementation capability of the STA) and TWT Requester Support for indicating whether the STA supports a TWT request function, as shown in Table 1.

TABLE 1

| Parameter | Explanation |
|---|---|
| Capability Information | A capability information (Capability Information) bit has a length of sixteen bits, for informing the AP of what kind of performance the STA has. |
| EHT Capabilities | It is included if a value of the dot11EHTOptionImplemented is "true". |
| TWT Requestor Support | It is set as 1 if a value of the dot11TWTOptionActivated is "true" and the STA supports a TWT request function; otherwise, it is set as 0. |

The EHT Capabilities includes fields as shown in Table 2:

TABLE 2

| Information Unit | Explanation |
|---|---|
| Element ID | Number for information |
| Length | Length of information |
| ML Support | It is set as 1 if a value of the dot11MultiLinkImplemented is "true" and the STA expects data transceiving via multiple links; or it is set as 1 if a value of the dot11MultiLinkImplemented is "true"; otherwise, it is set as 0. |
| STR Support | It is used for indicating a condition under which the STA can perform a STR operation, and includes one or more of the following items if the dot11SimultaneousTxRxPreferred is "true": Diff_TxRx for indicating a threshold value of a difference between a transmitting power and a receiving power; and Min_F for indicating a threshold value of a difference between a transmitting frequency and a receiving frequency. The two parameters indicates that a STR operation can be performed when a difference between a transmitting power and a receiving power of the STA is smaller than or equals to the Diff_TxRx, or/and a difference between a transmitting frequency and a receiving frequency is greater than or equals to the Min_F. |

2. After reception of the information sent by the STA, the AP allocates an association identifier AID and a primary link Primary Link for the STA, which are included in an association response (Association Response) message and sent to the STA. For example, the message includes a parameter of Capability Information (for informing the STA of what kind of performance the AP has), a parameter of EHT Capabilities (for informing the STA of ultra-high throughput implementation capability of the AP), a parameter of EHT Operation (for instructing an operation of the STA), a parameter of TWT Responder Support for indicating whether the network access device supports a TWT response function and a parameter of TWT Required for indicating whether the network access device expects the terminal to perform the TWT operation, are shown in Table 3.

TABLE 3

| Parameter | Explanation |
|---|---|
| Capability Information | A capability information (Capability Information) bit has a length of sixteen bits, for informing the AP of what kind of performance the STA has. |
| EHT Capabilities | It is included if a value of the dot11EHTOptionImplemented is "true". |
| EHT Operation | It is included if a value of the dot11EHTOptionImplemented is "true". |
| TWT Requestor Support | It is set as 1 if a value of the dot11TWTOptionActivated is "true" and the AP supports a TWT response function; otherwise, it is set as 0. |
| TWT Required | It is set as 1 to indicate that the AP expects the STA to perform a TWT operation; otherwise, it is set as 0. |

The EHT Capabilities includes fields as shown in Table 4.

TABLE 4

| Information Unit | Explanation |
|---|---|
| Element ID | Number for information |
| Length | Length of information |
| ML Support | It is set as 1 if the AP supports data transceiving via multiple links; otherwise, it is set as 0. |
| STR Support | It is used for indicating a condition under which the STA can perform a STR operation, and includes one or more of the following items if the dot11SimultaneousTxRxPreferred is "true": Diff_TxRx for indicating a threshold value of a difference between a transmitting power and a receiving power; and Min_F for indicating a threshold value of a difference between a transmitting frequency and a receiving frequency. The two parameters indicates that a STR operation can be performed when a difference between a transmitting power and a receiving power of the STA is smaller than or equals to the Diff_TxRx, or/and |

TABLE 4-continued

| Information Unit | Explanation |
|---|---|
| | a difference between a transmitting frequency and a receiving frequency is greater than or equals to the Min_F. |

The EHT Operation includes fields as shown in Table 5

TABLE 5

| Information Unit | Explanation |
|---|---|
| Element ID | Number for information |
| Length | Length of information |
| Primary Link | If the dot11MultiLinkEnabled is "true", it indicates a primary link among multiple links. The indicator may be an identifier of the link, a frequency band or a wave band of the link. |

3. After reception of the Association Response message, the STA reads contents of the message, and performs a multi-link operation according to the contents of the message.

For example, if a value of the TWT Required is 1, a value of the TWT Responder Support is 1 and a value of the ML Support value is 1, a TWT request message is sent to the AP on the primary link according to multi-link information indicated in the Primary Link.

For example, the message includes Request type: having the following values and meanings:

"Request": the STA requests the AP to determine a TWT parameter;

"Suggest": the STA provides a TWT parameter, and can also accept a different TWT parameter configured by the AP;

"Demand": the STA provides a TWT parameter, but does not accept a different TWT parameter configured by the AP;

When the Request type is the "suggest" or "demand", the following parameters need to be included:

Target Wake Time: a next wake-up time in a TWT mode;

TWT wake interval: an interval between two wake-ups in the TWT mode; and

Minimum TWT awake duration: a minimum time for data transceiving in an awake state.

4. After reception of the TWT request message, the AP configures a TWT parameter and sends a TWT response message to the STA. For example, the message includes: Response type: having the following values and meanings:

"Accept": the AP accepts the STA's request;

"Alternate": the AP provides a different TWT parameter;

"Dictate": the AP provides a different TWT parameter which cannot be changed;

"Reject": the AP rejects the STA's request;

When the Response type is "Accept", "Alternate" or "Dictate", the following parameters need to be included:

Target Wake Time: a next wake-up time in a TWT mode;

TWT wake interval: an interval between two wake-ups in a TWT mode;

Minimum TWT awake duration: a minimum time for data transceiving in an awake state.

5. After the STA receives the TWT response message, for example, if Response type=Accept, it performs a TWT operation on respective links operated by the STA according to the received TWT parameters;

if Response type=Alternate, it sends a TWT request message that can include a TWT parameter accepted by the STA to the AP in the case that the STA accepts the TWT parameters in the message; and it sends a TWT request message that includes a TWT parameter suggested by the STA to the AP in the case that the STA does not accept the TWT parameters in the message;

if Response type=Dictate, it sends a TWT request message that can include a TWT parameter accepted by the STA to the AP in the case that the STA accepts the TWT parameters in the message; and it does not send a TWT request message to the AP in the case that the STA does not accept the TWT parameters in the message.

In another specific embodiment, a method for connecting to the network access device includes the same step 1 and step 2 as the above-mentioned embodiment, which will not be repeated here. In this specific embodiment, the method for connecting to the network access device further includes the following steps:

23. After reception of the Association Response message, the STA reads contents in the message and performs a multi-link operation according to the contents in the message. For example, if the message includes the parameter Diff_TxRx, a transmitting power of the STA does not exceed a sum of a receiving power and the Diff_TxRx when the STA transmits and receives data on multiple links at the same time.

if the message includes the parameter Min_F, a transmitting frequency of the STA is not less than a sum of a receiving frequency and the Min_F (if the transmitting frequency is greater than the receiving frequency) or not greater than a difference between the receiving frequency and the Min_F (if the transmitting frequency is less than the receiving frequency) when the STA transmits and receives data on multiple links at the same time.

If the message includes both the parameter Diff_TxRx and the parameter Min_F, the transmitting power of the STA does not exceed a sum of the receiving power and the Diff_TxRx and the transmitting frequency of the STA is not less than a sum of the receiving frequency and the Min_F (if the transmitting frequency is greater than the receiving frequency) or not greater than a difference between the receiving frequency and the Min_F (if the transmitting frequency is less than the receiving frequency) when the STA transmits and receives data on multiple links at the same time.

In another specific embodiment, Primary Link is added to the parameters in the Association Request message of the step 1. For example, the parameters included in the message are shown in Table 6.

TABLE 6

| Parameter | Explanation |
|---|---|
| Capability Information | A capability information (Capability Information) bit has a length of sixteen bits, for informing the AP of what kind of performance the STA has. |

TABLE 6-continued

| Parameter | Explanation |
| --- | --- |
| EHT Capabilities | It is included if a value of the dot11EHTOptionImplemented is "true". |
| TWT Requestor Support | It is set as 1 if a value of the dot11TWTOptionActivated is "true" and the STA supports a TWT request function; otherwise, it is set as 0. |
| Primary Link | It is included if a value of the dot11MultiLinkEnabled is "true", for indicating information of a primary link that the STA expects to operate. The information may be an identifier of the link, a frequency band or a wave band of the link. |

For the rest of the specific embodiment, reference may be made to the above-mentioned embodiment, and thus they are not repeated here.

In another specific embodiment, the Association Request message and the Association Response message in the forgoing two specific embodiments can be replaced with a Reassociation Request message and a Reassociation Response message. For the rest of the specific embodiment, reference may be made to the above-mentioned embodiments, and thus they are not repeated here.

Some other embodiments of the application also provide a terminal to be connected to a network access device, which has functions of implementing the methods described in the above specific embodiments. The functions can be realized by hardware, and can also be realized by hardware executing corresponding software. The hardware or software includes one or more devices or modules corresponding to the above functions, for example, a storage device or module, an association request message transmission device or module, an association response message reception device or module, and a multi-link operation device or module.

The terminal to be connected to the network access device provided in the embodiments of the application is used to implement the method for connecting to the network access device in the above embodiments, and provide the same implementation principles and technical effects, and thus will not be repeated here.

Some other embodiments of the application also provide a computer-readable storage medium. The computer-readable storage medium may include computer instructions, which when executed on a terminal, cause the terminal to perform respective steps of the method for connecting to the network access device in the above-mentioned specific embodiments.

It should be understood that the serial numbers for the above-mentioned processes in various embodiments of the present application does not mean an order of execution. Some or all of the steps can be executed in parallel or one after the other. The order of execution of the respective processes should be determined based on their functions and an internal logic thereof, and it should not define any limitation to the implementation processes of the embodiments of the present application.

It should be anticipated by those skilled in the art that the various units and algorithm steps of the examples described in conjunction with the embodiments of the application can be implemented by electronic hardware or a combination of computer software and electronic hardware. Whether these functions are implemented by hardware or software depends on a specific application and design constraint conditions of the technical solution. Those skilled in the art can use different methods for respective specific applications to implement the described functions, which should not be considered beyond the scope of the application.

It should be understood by those skilled in the art that specific operation processes of the above-described system, device and unit can refer to corresponding processes in the foregoing method embodiments, and thus are not repeated in order for convenience and conciseness.

It should be understood that the system, device and method disclosed in the embodiments of the application may be implemented in other ways. For example, the device embodiments described above are only illustrative, and division of the units is only a division based on logical functions, and may be any other division in an actual implementation where multiple units or components may be combined or integrated into another system, or some features can be ignored or not implemented, for example. In addition, the shown or discussed mutual coupling or direct coupling or communication connection may be alternatively an indirect coupling or communication connection through some interfaces, devices or units, and may be in electrical, mechanical or other forms.

The units described as separate components may or may not be physically separated, and the components shown as units may or may not be physical units, that is, they may be located in one place, or may be distributed on multiple network units. Some or all of the units may be selected according to actual needs to achieve the objectives of the solutions of the embodiments.

In addition, the functional units in each embodiment of the application may be integrated into one processing unit, or may exist individually and physically, or may be integrated into respective units on a basis of two or more units.

If the function is implemented in a form of a software functional unit and sold or used as an independent product, it can be stored in a computer readable storage medium. Based on this understanding, the essential technical solutions of the application or a part of the technical solutions that constitutes contributions on the related art or a part of the technical solutions can be embodied in a form of a software product, and the computer software product may be stored in a storage medium including instructions that are executed by a computer device (which may be a personal computer, a server, a network device, or a terminal device, etc.) to perform all or a part of the method steps described in the various embodiments of the application. The aforementioned storage medium may include various media that can store program codes such as a USB disk, a mobile hard disk, a ROM, a RAM, a magnetic disk, or an optical disk.

The terms used in the embodiments of the application are provided only for the purpose of describing specific embodiments, and are not intended to limit the present invention. The singular forms indicated by the words of "a", "said" and "the" in the embodiments of the application and the appended claims are also intended to include plural forms, unless it is particularly indicated. It should also be understood that the term "and/or" as used herein refers to and includes any or all possible combinations of one or more associated items as listed. The character "/" in the application generally means that the associated items before and after it are in an "or" relationship.

Depending on context, the word "if" as used herein can be interpreted as "when" or "upon" or "in response to a determination" or "in response to a detection". Similarly, depending on context, the phrase "if it is determined that (alleged condition or event)" or "if it is detected that (alleged condition or event)" can be interpreted as "when it is determined that" or "in response to a determination" or "when it is detected (alleged condition or event)" or "in response to a detection (alleged condition or event)".

It should be understand by those skilled in the art that all of or a part of the steps in the method of the above-discussed embodiments can be implemented by a relevant hardware as instructed by programs. The programs may be stored in a readable storage medium of a device, and are executed to perform all of or a part of the steps. The storage medium may be a FLASH, an EEPROM, etc.

The specific embodiments of the application have been described above, but the protection scope of the application is not limited thereto. Within the technical scope of the application, those skilled in the art can easily anticipate any changes or substitutions, which fall with the protection scope of the application. Therefore, the protection scope of the application is determined by the protection scope of the appended claims.

What is claimed:

1. A method for connecting to a network access device, comprising:

transmitting an association request message or a reassociation request message to the network access device;

receiving an association response message or a reassociation response message sent by the network access device, wherein the association response message or the reassociation response message comprises a parameter of Access point- Extremely High Throughput (AP-EHT) Capabilities, a parameter of Extremely High Throughput (EHT) Operation, a parameter of Target Wake Time (TWT) Responder Support for indicating whether the network access device supports a TWT response function, and a parameter of TWT Required for indicating whether the network access device expects a terminal to perform a TWT operation, and wherein the parameter of AP-EHT Capabilities comprises a field of Access point- Multi-link (AP-ML) Support for indicating whether the network access device supports data transceiving via multiple links, and the parameter of EHT Operation comprises a field of AP-Primary Link for indicating a primary link for a multi-link operation; and reading contents of the association response message or the reassociation response message, and performing the multi-link operation on the basis of the contents;

wherein the parameters of AP-EHT Capabilities, EHT Operation and TWT Responder Support in the association response message or the reassociation response message are set according to a parameter table locally at the network access device by:

including the parameters of AP-EHT Capabilities and EHT Operation in the association response message or the reassociation response message when a parameter of AP-dot11EHTOptionImplemented in the parameter table indicates that the network access device supports an EHT feature;

setting the TWT Responder Support to indicate that the network access device supports the TWT response function when a parameter of AP-dot11TWT Option-Activated in the parameter table indicates that the network access device expects utilization of the TWT operation and the network access device supports the TWT response function; and setting the AP-Primary Link when a parameter of AP-dot11MultiLinkImplemented in the parameter table indicates that the network access device supports the multi-link operation.

2. The method for connecting to the network access device according to claim 1, wherein the performing the multi-link operation on the basis of the contents comprises:

transmitting a TWT request message to the network access device on the primary link according to primary link information indicated in the AP-Primary Link when the TWT Required indicates that the network access device expects the terminal to perform the TWT operation, the TWT Responder Support indicates that the network access device supports the TWT response function and the AP-ML Support indicates that the network access device supports the data transceiving via multiple links; and receiving, on the primary link, a TWT response message sent by the network access device, and applying parameters in the TWT response message to respective links used by the terminal.

3. The method for connecting to the network access device according to claim 1, wherein the parameter of EHT Operation further comprises a field of Access point-Simultaneous Transmit/Receive (AP-STR)_Support for indicating a condition under which the network access device instructs the terminal that a STR operation is operable, wherein the field comprises one or more of the following parameters:

AP-Diff_TxRx for indicating a threshold value of a difference between a transmitting power and a receiving power; and AP-Min_F for indicating a threshold value of a difference between a transmitting frequency and a receiving frequency.

4. The method for connecting to the network access device according to claim 3, wherein the performing the multi-link operation on the basis of the contents further comprises:

performing the STR operation when an absolute value of the difference between the transmitting power and the receiving power of the terminal is less than or equal to the AP-Diff_TxRx, or/and an absolute value of the difference between the transmitting frequency and the receiving frequency of the terminal is greater than or equal to the AP-Min_F.

5. The method for connecting to the network access device according to claim 3, wherein the parameter of EHT Operation in the association response message or the reassociation response message is set according to the parameter table locally at the network access device, which comprises:

setting the parameters included in the AP-STR Support when a parameter of AP-dot11 SimultaneoursTxRxPreferred in the parameter table indicates that the network access device expects preferential utilization of the STR operation.

6. The method for connecting to the network access device according to claim 1, wherein the association request message or the reassociation request message comprises a parameter of STA-EHT Capabilities and a parameter of TWT Requester Support for indicating whether the terminal supports a TWT request function, wherein the parameter of STA-EHT Capabilities comprises a field of STA-ML Support for indicating whether the terminal supports data transceiving via multiple links.

7. The method for connecting to the network access device according to claim 6, wherein the parameter of STA-EHT Capabilities further comprises a field of STA-STR Support for indicating a condition under which the terminal can perform a STR operation, and the field of STA-STR Support comprises one or more of the following parameters:

STA-Diff_TxRx for indicating a threshold value of a difference between a transmitting power and a receiving power; and STA-Min_F for indicating a threshold value of a difference between a transmitting frequency and a receiving frequency.

8. The method for connecting to the network access device according to claim 7, wherein the performing the multi-link operation on the basis of the contents further comprises:
performing the STR operation when an absolute value of the difference between the transmitting power and the receiving power of the terminal is less than or equal to the STA-Diff_TxRx, or/and an absolute value of the difference between the transmitting frequency and the receiving frequency of the terminal is greater than or equal to the STA-Min_F.

9. The method for connecting to the network access device according to claim 6, wherein the association request message or the reassociation request message further comprises a parameter of STA-Primary Link for indicating a primary link that the terminal expects to operate.

10. The method for connecting to the network access device according to claim 6, wherein the parameters of STA-EHT Capabilities and TWT Requester Support in the association request message or the reassociation request message are set according to a parameter table locally at the terminal, which comprises:
including the parameter of STA-EHT Capabilities in the association request message or the reassociation request message when a parameter STA-dot11EHTOptionImplemented in the parameter table indicates that the terminal supports an EHT feature;
setting the TWT Requester Support to indicate that the terminal supports a TWT request function when a parameter STA-dot11TWTOptionActivated in the parameter table indicates that the terminal expects to perform a TWT operation and the terminal supports the TWT request function;
setting the STA-ML Support to indicate that the terminal supports data transceiving via multiple links when a parameter of STA-dot11MultiLinkImplemented in the parameter table indicates that the terminal supports a multi-link operation and the terminal expects to operate multiple links for data transceiving, or setting the STA-ML Support to indicate that the terminal supports the data transceiving via multiple links when the parameter of STA-dot11MultiLinkImplemented in the parameter table indicates that the terminal supports the multi-link operation.

11. The method for connecting to the network access device according to claim 7, wherein the parameter of STA-EHT Capabilities in the association request message or the reassociation request message is set according to the parameter table locally at the terminal, which comprises:
setting the parameters included in STA-STR Support when a parameter of STA-dot11Simultaneours TxRx-Preferred in the parameter table indicates that the terminal expects to preferentially perform the STR operation.

12. The method for connecting to the network access device according to claim 9, wherein the parameter of STA-Primary Link in the association request message or the reassociation request message is set according to the parameter table locally at the terminal, which comprises:
including the parameter of STA-Primary Link in the association request message or the reassociation request message when a parameter of STA-dot11MultiLinkImplemented in the parameter table indicates that the terminal supports a multi-link operation.

13. A terminal to be connected to a network access device, comprising:
a memory for storing programs;
a processor coupled to the memory, and configured to execute the programs to cause the terminal to perform the method for connecting to the network access device according to claim 1.

14. A terminal to be connected to a network access device, comprising:
an association request message transmission device configured to transmit an association request message or a reassociation request message to the network access device;
an association response message reception device configured to receive an association response message or a reassociation response message sent by the network access device, wherein the association response message or the reassociation response message comprises a parameter of Access point- Extremely High Throughput (AP-EHT) Capabilities, a parameter of Extremely High Throughput (EHT) Operation, a parameter of TWT Responder Support for indicating whether the network access device supports a Target Wake Time (TWT) response function, and a parameter of TWT Required for indicating whether the network access device expects a terminal to perform a TWT operation, and wherein the parameter of AP-EHT Capabilities comprises a field of Access point- Multi-link (AP-ML) Support for indicating whether the network access device supports data transceiving via multiple links, and the parameter of EHT Operation comprises a field of AP-Primary Link for indicating a primary link for a multi-link operation; and
a multi-link operation device configured to read contents of the association response message or the reassociation response message, and perform a multi-link operation on the basis of the contents,
wherein the parameters of AP-EHT Capabilities, EHT Operation and TWT Responder Support in the association response message or the reassociation response message are set according to a parameter table locally at the network access device by:
including the parameters of AP-EHT Capabilities and EHT Operation in the association response message or the reassociation response message when a parameter of AP-dot11EHTOptionImplemented in the parameter table indicates that the network access device supports an EHT feature;
setting the TWT Responder Support to indicate that the network access device supports the TWT response function when a parameter of AP-dot11TWT Option-Activated in the parameter table indicates that the network access device expects utilization of the TWT operation and the network access device supports the TWT response function; and
setting the AP-Primary Link when a parameter of AP-dot11MultiLinkImplemented in the parameter table indicates that the network access device supports the multi-link operation.

15. The terminal to be connected to the network access device according to claim 14, wherein the performing the multi-link operation on the basis of the contents comprises:
transmitting a TWT request message to the network access device on the primary link according to primary link information indicated in the AP-Primary Link, when the TWT Required indicates that the network access device expects the terminal to perform the TWT operation, the TWT Responder Support indicates that the network access device supports the TWT response function and the AP-ML Support indicates that the network access device supports the data transceiving via multiple links; and receiving, on the primary link, a TWT response message sent by the network access device, and applying parameters in the TWT response message to respective links used by the terminal.

16. A computer-readable storage medium comprising computer instructions, which when executed on a terminal, cause the terminal to perform the method for connecting to the network access device according to claim 1.

* * * * *